Jan. 7, 1930.  B. WALKER  1,742,566
PARKING DEVICE
Filed July 5, 1928  4 Sheets-Sheet 2
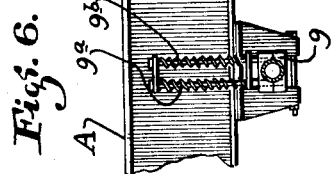
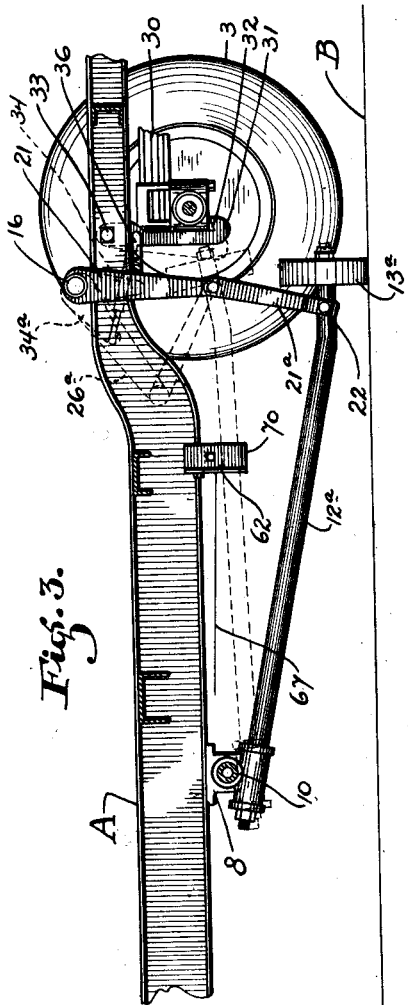
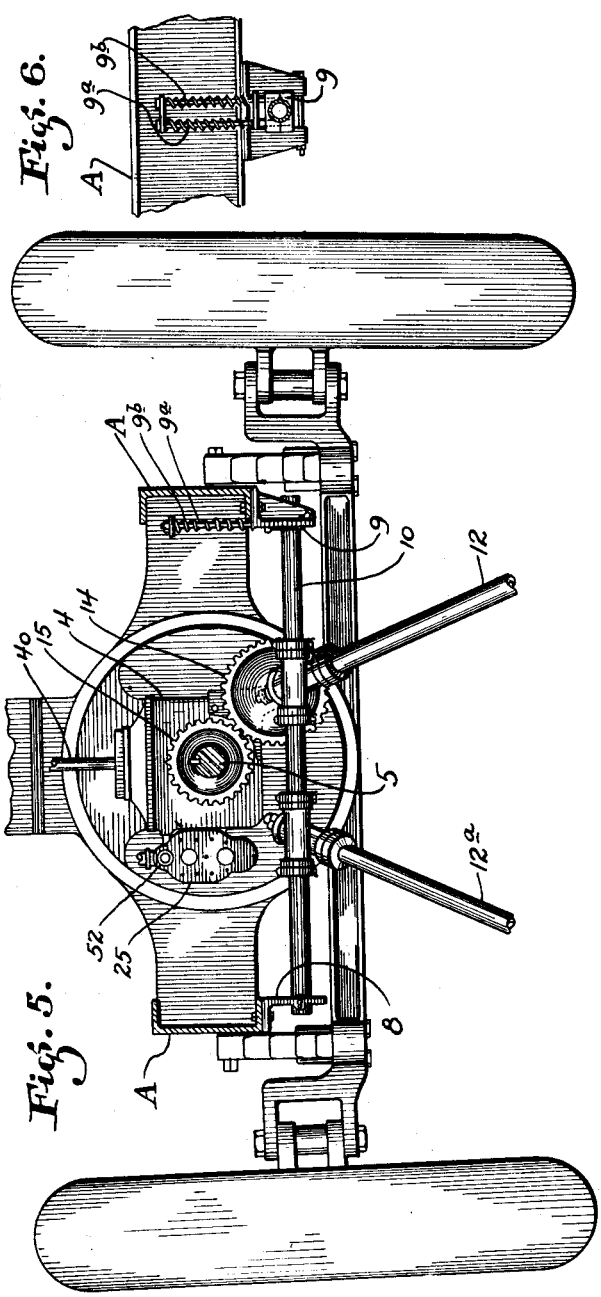
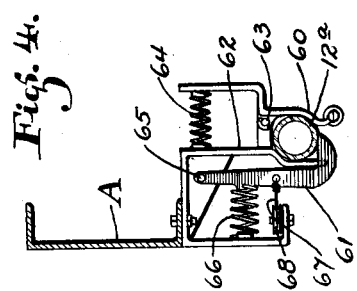
INVENTOR.
Brooks Walker.
BY
Townsend, Loftus r abbett
ATTORNEYS.

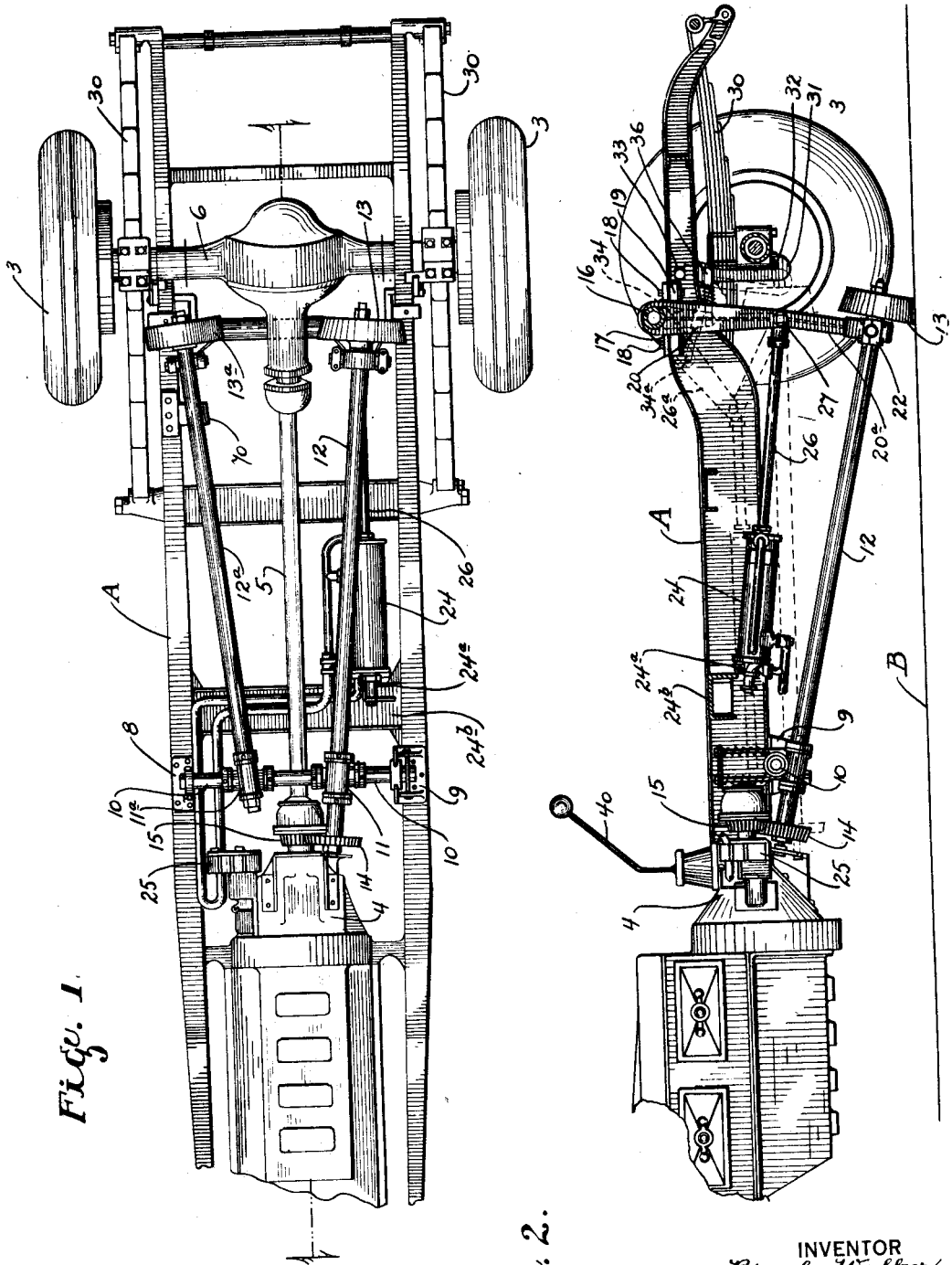

Jan. 7, 1930.  B. WALKER  1,742,566
PARKING DEVICE
Filed July 5, 1928   4 Sheets-Sheet 3
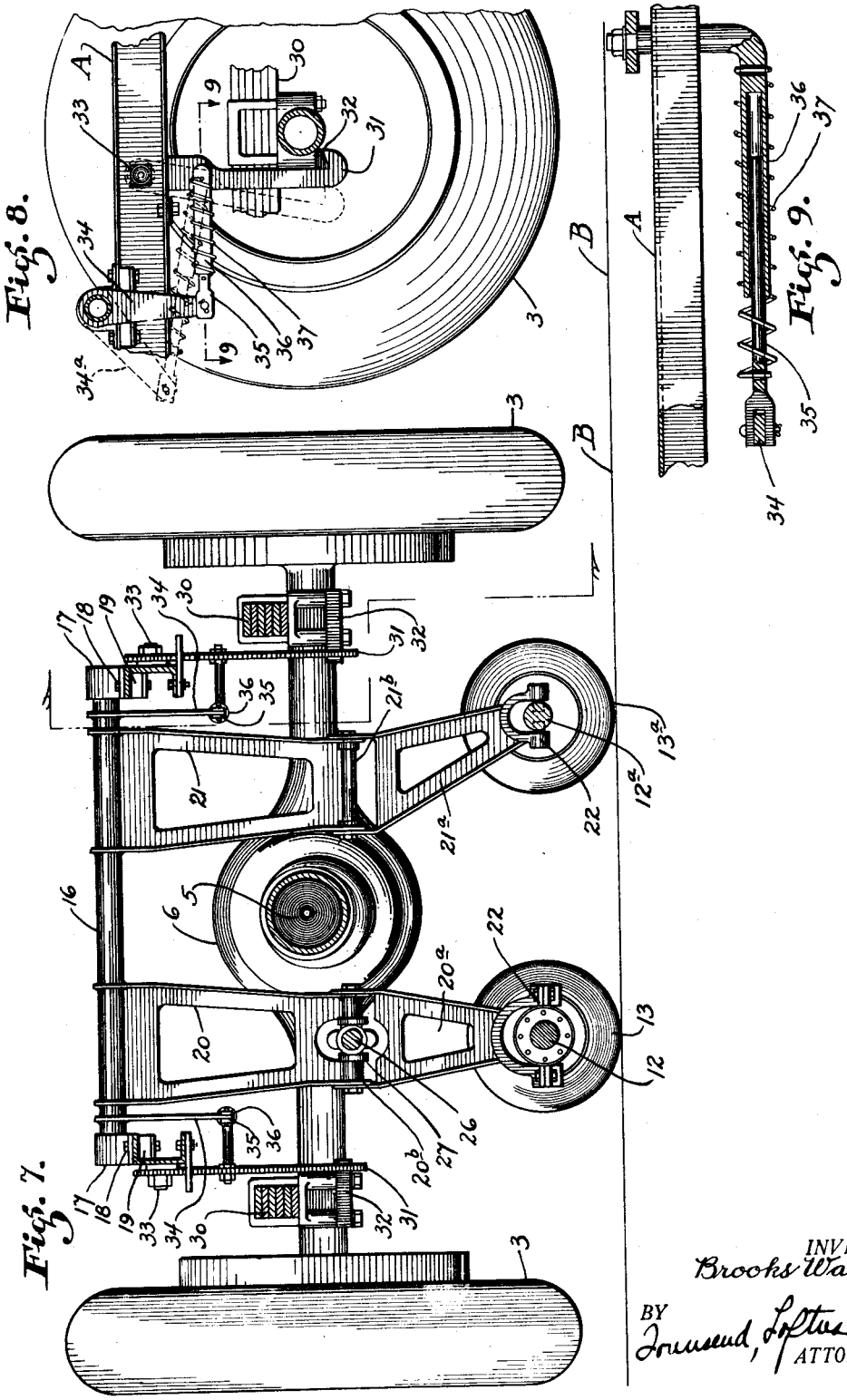
INVENTOR.
Brooks Walker.
BY
Townsend, Loftus & Abbett
ATTORNEYS.

Patented Jan. 7, 1930

1,742,566

UNITED STATES PATENT OFFICE

BROOKS WALKER, OF PIEDMONT, CALIFORNIA

PARKING DEVICE

Application filed July 5, 1928. Serial No. 290,383.

This invention relates to a parking device for automobiles and the like, and especially to improvements on the structure shown in my co-pending application entitled "Parking device for automobiles" filed May 3, 1927, Serial Number 188,429.

The object of the present invention is to facilitate the parking of automobiles in congested districts where parking space is limited or where automobiles are so closely spaced that it is difficult to approach the curb, and especially to improve and simplify the construction and operation of the parking device shown in the application above referred to.

The improved parking device is shown by way of illustration in the accompanying drawings, in which, Fig. 1 is a bottom view of an automobile showing the application of the parking device, Fig. 2 is a side elevation partially in section, said view showing the rear end of the automobile elevated by means of the parking device, Fig. 3 is a similar view showing parts of the parking device removed, Fig. 4 is an enlarged detailed sectional view of the retaining latches, Fig. 5 is an enlarged cross-sectional view of the automobile showing the gears whereby the jack shaft is driven, the jackshaft and the cross-shaft supporting the same.

Fig. 6 is a detailed view of one of the journal members supporting the cross-shaft, Fig. 7 is an enlarged detailed cross-section similar to Fig. 5 but looking in the opposite direction, Fig. 8 is a detailed side elevation in section taken on line 8—8 of Fig. 7.

Fig. 9 is an enlarged sectional view taken on line 9—9 of Fig. 8,

Figure 10:
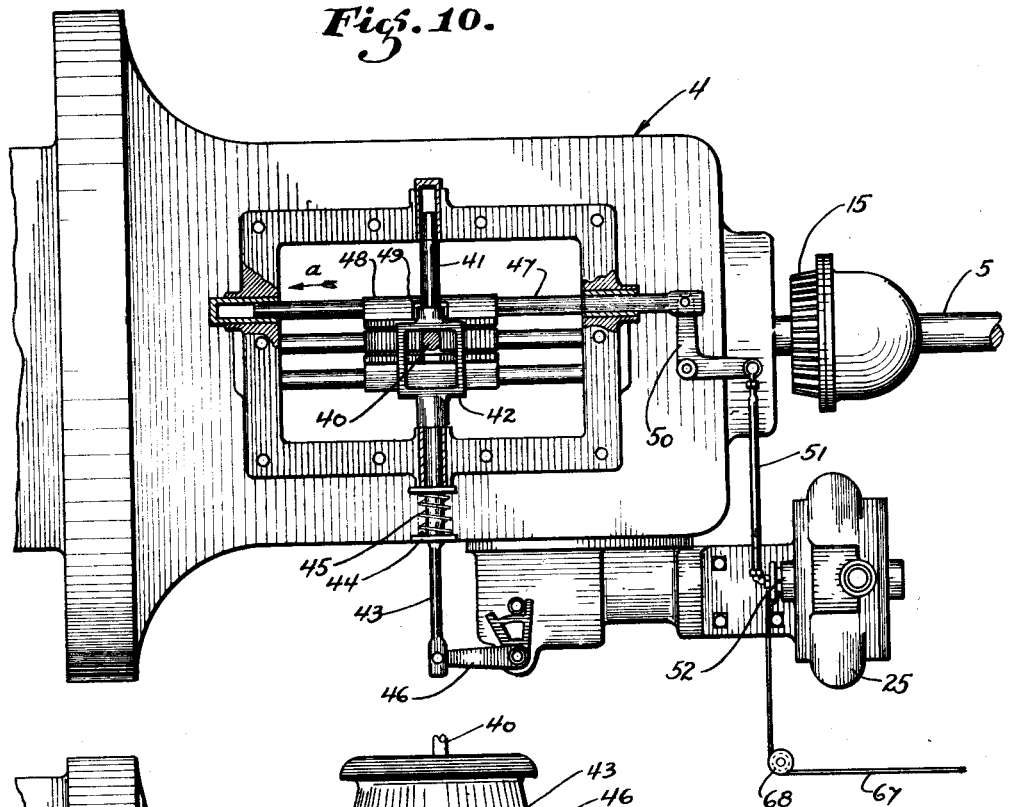
Fig. 10 is a plan view of the transmission case, said view being partially in section,

Referring to the drawings in detail, and particularly to Figs. 1 and 2, A indicates the main frame of an automobile, 3 the rear wheels, 4 a standard form of gear transmission, 5 the propeller shaft driven thereby, 6 the rear axle housing which contains the usual form of differential mechanism whereby the axles supporting the rear wheels are driven.

Extending crosswise of the main frame and secured thereto as at 8 and 9, is a cross shaft 10 upon which is pivotally supported a pair of bearing members 11 and 11$^a$ for a shaft 12, which will hereinafter be referred to as a jack-shaft. Journalled in the bearing 11$^a$ is a shaft 12$^a$ which will hereinafter be referred to as the exhaust jack-shaft. The jack-shafts 12 and 12$^a$ are disposed on opposite sides of the propeller shaft, as shown in Fig. 1 and both shafts carry wheels or rollers such as indicated at 13 and 13$^a$, the roller 13 being power driven as will hereinafter be described, while the roller 13$^a$ serves as an idler.

Secured on the front end of the jack-shaft 12 is a gear 14, and secured on the transmission shaft is a gear 15. The gears 14 and 15 are normally maintained out of mesh but they are automatically thrown into mesh when the rear end of the automobile is to be elevated, as will hereinafter be described.

Extending crosswise of the main frame A is a shaft 16, the opposite ends of which are supported in journal members 17, these journal members being secured to the main frame by means of bolts 18 and being resiliently supported by interposing rubber pads such as shown at 19.

Secured to the shaft 16 is a pair of toggle levers, 20 and 21. Pivotally secured to the rear ends of the jack-shafts 12 and 12$^a$ as at 22 is a pair of toggle levers 20$^a$ and 21$^a$. A pivotal connection 20$^b$ is formed between the toggle members 20 and 20$^a$ and a similar pivotal connection 21$^b$ is formed between the toggle levers 21 and 21$^a$. The toggle levers serve two functions. First that of normally retaining the jack-shafts and the rollers 13 and 13$^a$ in a retracted or raised position with relation to the pavement, indicated at B, and secondly that of raising or elevating the rear end of the automobile, as shown in Fig. 2.

In view of the fact that the rear end of an automobile is fairly heavy, it should be realized that considerable power will be required to raise or elevate the rear end. In the present instance, a hydraulically actuated piston or ram is employed for this purpose. The piston is placed in a cylinder 24, and oil or any other suitable fluid is delivered thereto under pressure by means of a power driven pump 25. The piston is provided with a connecting rod 26, and the rear end thereof is pivotally connected as at 27 to the toggle levers 20 and 20ª. The cylinder 24 is pivotally supported as at 24ª to a cross brace 24ᵇ and when oil under pressure is delivered to the cylinder the piston and rod 26 will move rearwardly, thus swinging the toggle levers from the dotted line position indicated at 26, Fig. 2, to the full line position shown. During this movement the toggle levers are straightened out, the jack-shafts 12 and 12ª are swung about the cross shaft 10 through means of the journal members 11 and 11ª, the rollers 13 and 13ª are lowered into engagement with the pavement and the rear end of the automobile is elevated.

Gears 14 and 15 are at the same time automatically thrown into mesh and if the engine is running it is only necessary to shift the gears into low or reverse, in order that power may be transmitted through the gears 14 and 15 to the jack-shaft 12, and the driving roller 13. If the transmission is in low the rear end of the automobile will swing to the left, and conversely, if the transmission is thrown into reverse the car will swing to the right. It is thus possible, when parking a machine between closely spaced cars to merely drive the front end of the car in towards the curb and then to raise or elevate the rear end by means of the mechanism described, when it is possible to swing the rear end in towards the curb between the closely spaced cars.

Thereafter the oil flow to the cylinder 24 is reversed. This causes retraction or folding up of the toggle arms, the rear end is consequently lowered and the jack-shafts and rollers are elevated or retracted to assume the dotted line position shown in Fig. 2.

In actual practice it has been found that when gears 14 and 15, such as disclosed, are employed that meshing of the gears is not always possible as the flat or butt end of the gear teeth will sometimes align. This would throw a great strain on the cross shaft 10 and would tend to slightly spring or bend the same unless some part of the mechanism is capable of yielding. A resilient bearing 9 has accordingly been provided. This is best illustrated in Figs. 5 and 6. The bearing proper is supported by a pair of rods 9ª, which extend through the side flange of the main frame A. Helical compression springs are interposed between the outer ends of the rods and the flange, and a resilient support is thus provided for one end of the cross shaft, permitting it to yield if the gears 14 and 15 do not happen to mesh. The moment, however rotary movement is transmitted to the transmission gear 15, slippage between the gears will take place and they will instantly be thrown into mesh by upward movement of the bearing 9 and shaft 10.

It is well known that the rear end of the main frame of an automobile is supported with relation to the rear axle housing by means of semi-eliptical springs or the like, such as indicated at 30. I found that when the rear end is elevated, the springs 30 tend to bow upwardly as the load is raised, and that considerable movement is lost in this manner before the rear wheels are actually lifted from the pavement. In order to eliminate this lost motion, a hook shaped latch 31 is employed, see Figs. 2, 7 and 8. The lower hook shaped end engages a plate 32 or the like secured to the rear axle housing. The upper end of the latch is pivotally attached to the main frame A, as indicated at 33. Secured to the cross shaft 16 is a crank arm 34 and forming a connection between the lower end of said crank arm and the latch 31 is an extensible link consisting of two members such as indicated at 35 and 36. The member 36 is tubular, as shown in Fig. 9, so that the member 35 may telescope with relation thereto. A helical coil spring 37, connects the two members and as such permits contraction or elongation of the link connection. The members 34, together with the link members 35 and 36 form a means for automatically engaging or disengaging the latch 31 which relation to the plate 32 on the rear axle housing. In fact, it might here be stated that two sets of latches, links and crank arms 34 are employed, as shown in Fig. 7, so that both of the springs 30 on opposite sides of the frame will be engaged.

The automatic operation of the latches 31 will be as follows: When the toggle levers are collapsed and retracted, as shown by dotted lines at 26 in Figs. 2 and 3, crank arms 34 will assume the dotted line position indicated at 34ª. The moment, however, that the toggle levers are extended the crank arms 34 swing downwardly and rearwardly, and as such swing the latches 31 into engagement with the plates 32 and engagement is formed before the rollers reach the pavement and before any lifting of the rear end takes place. The latches thus engaged prevent extension of the springs, as the rear end is being elevated, and considerable lost motion is thus eliminated. The reason for providing the telescoping link connection indicated at 35 and 36 is to permit continued movement of the crank arms 34 while the rear end is being elevated or lifted. The detailed construction of the telescoping link connection is well illustrated in Figs. 8 and 9.

Figure 11:
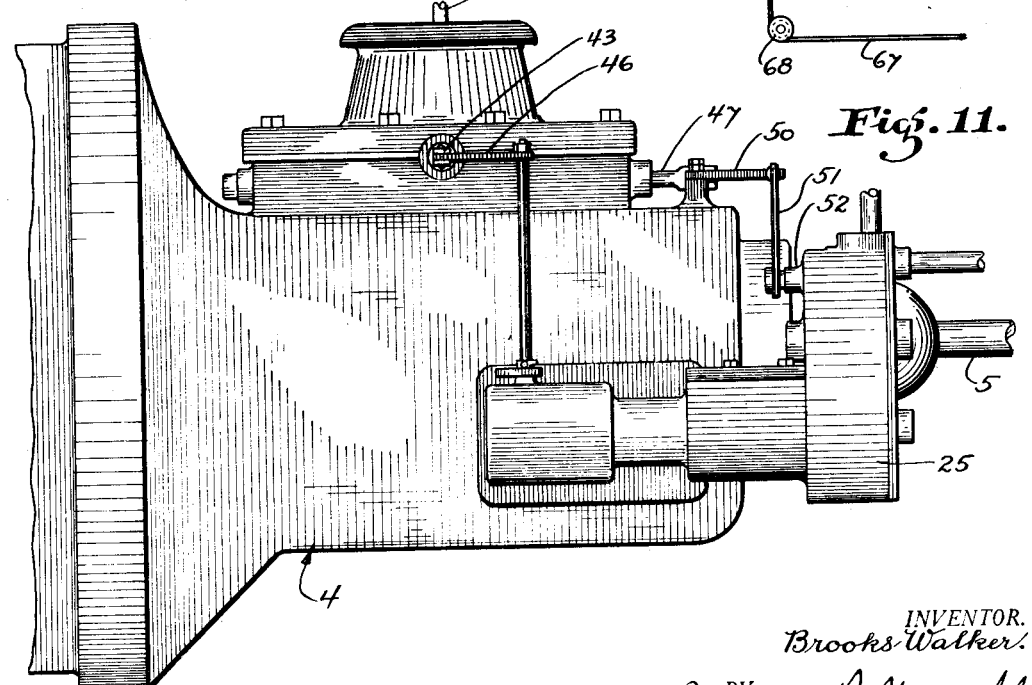
Fig. 11 is a side elevation of the transmission case.

In order that the oil pump and the hydraulic cylinder actuated thereby may be simply and readily controlled, a single lever control mechanism is employed, this being best illustrated in Figs. 10 and 11. In fact, the controlling lever employed in this instance is the gear shift lever indicated at 40. Slidably mounted transversly of the gear transmission housing is a shaft 41, the central portion of which is enlarged to form a square-shaped frame such as indicated at 42. By swinging the gear shift lever laterally from one side to the other, transverse movement is imparted to the shaft 41. One end of the shaft is provided with an extension 43, on which is secured a collar 44, a spring 45 is interposed between the collar and the side of the transmission case, and the shaft 41, together with the square frame 42 attached thereto will accordingly normally assume the position shown in Fig. 10, and if it is desired to change its position, it is necessary to do so manually by swinging the gear shift lever sideways to the right. When this is done, movement is transmitted from the extension 43 to a crank arm 46. This actuates a gear shift within the transmission case which is not here illustrated. This gear shift connects the hydraulic pump 25 with the transmission gears so that when the transmission is operated the pump will be driven and fluid or oil will be delivered to the cylinder 24. The flow of the oil to the cylinder must, however, be controlled. That is, it must be delivered to one end or another thereof, so that the rear end may either be elevated or lowered as the case may be. In the present instance this control is also actuated from the gear shift lever through means of a longitudinally extending shaft 47 which is slidably mounted in the transmission gear case. The shaft 47 is provided with a collar 48, in which is formed a notch indicated by dotted lines at 49, see Fig. 10. When the gear shift lever 40 is swung sideways to the right, it will enter the notch 49 and if the gear shift lever is then moved forwardly, movement will be transmitted to a bell crank 50. The movement of the bell crank will in turn be transmitted through a link 51 to a valve 52 on the pump. For instance, if rod 47 is moved forwardly in the direction of arrow $a$ it will set the valve so that the oil delivered to the pump will move the piston in a direction to cause elevation of the rear end. Conversely, if shaft 47 is moved by the lever 40 in a direction opposite to the direction of arrow $a$ valve 52 will be set to reverse the flow of oil to the cylinder and hence cause the rear end to be lowered.

In order to explain the operation, it will be assumed that the shaft 47 has been moved forwardly in the direction of arrow $a$ and that the valve 52 is so positioned that the oil delivered by the pump 25 will cause the piston and rod 26 to move rearwardly and thereby cause elevation of the rear end. When this has been accomplished the gear shift lever is moved either into reverse or low position as the case may be and power will then be transmitted through the gears 14 and 15 and the jack shaft 12 to the driving roller 13, thus causing it to rotate to the right or the left, as the case may be, thereby causing the rear of the car to be swung towards or away from the curb.

By referring to Figs. 3 and 4, it will be noted that a latch mechanism is illustrated. There are two latches, such as indicated at 60 and 61. The latch 60 is pivoted to a bracket 62 at the point 63 and its upper end is engaged by compression spring 64. The latch 61 is pivotally supported as at 65 and it is also engaged by a compression spring 66. Attached to the latch 61 at a point near its lower end is a cable 67. This cable is passed over guide pulleys, such as indicated at 68 and it is finally attached to the link 51, see Fig. 10. The purpose of the two latches indicated at 60 and 61 is to support the jack shafts and the toggles when in their elevated or retracted position as the hydraulic pressure in the cylinder can not be depended upon to maintain them elevated. That is, leakage takes place and the toggles and shafts would gradually lower themselves. In the present instance, latches 60 and 61 engage the jack shaft 12 at a point near its rear end, as indicated at 70, see Fig. 3. The latch 61 is automatically released when the jack shafts are to be lowered, the automatic release being obtained by connecting the cable 67 with the link 51. That is, when the link 51 is moved to shift the valve 52 to position where the flow of the oil will lower the toggles and jack shafts, latch 61 is released to permit such lowering movement. On the other hand when the position of the link 51 and the valve 52 is reversed to raise the toggles and the jack shafts, latch 61 is pulled inwardly by means of the cable and as such will spring in and snap in under the jack shaft when it is raised to elevated position. It will accordingly be noted that both the latches 31 which prevents extension of the main supporting springs 30 and the latch 61 which support the jack shaft, are automatically operated.

The mechanism shown in the present instance is an improvement on the mechanism shown in my co-pending application already referred to. The points of improvement are as follows:

In the present instance a two point support is provided when the rear end is elevated, to wit, the rollers 13 and $13^a$. In my co-pending application a single roller centrally disposed is employed. The two point support has been found to be a great improvement over the former construction. Second, two sets of toggle levers are employed, thereby causing a more uniform distribution of the load on the supporting rollers and on the frame.

Third, latches 31 are employed to prevent extension of the main supporting springs 30 when the rear end is to be elevated.

Fourth, means are provided for automatically actuating said latches.

Fifth, means are employed for insuring meshing of the gears 14 and 15, the means employed being the spring supported bearing 9.

Sixth, a positive supporting latch 61 is employed to engage the jack shaft 12 when in elevated position, and means are employed for automatically engaging or releasing the same with relation to the jack shaft.

Seventh, another feature which should be noted when comparison is made with the structure shown in my former application is the fact that the toggles are pivotally attached to the main frame A while in my former structure the toggles were secured to the rear axle housing. By transferring the weight of the toggles, the jack shafts, the rollers etc. to the main frame as shown in the present structure, the amount of unsprung weight formerly encountered is materially reduced and the structure is simplified. Furthermore there will be no movement whatsoever of the mechanism when supported as here shown under driving conditions.

While certain features of the present invention are more or less specifically described, I wish it understood that various changes may be resorted to within the scope of the appended claims, similarly, that the materials and finishes of the several parts employed may be such as the manufacturer may decide, or varying conditions or uses may demand.

Having thus described my invention, what I claim and desire to secure by Letters Patent is:

1. The combination with a transmission shaft and the main frame of a motor driven vehicle, a shaft extended crosswise of the main frame, a jack shaft pivotally connected at one end with the cross shaft, the opposite end of the jack shaft being free to swing to occupy a raised position parallel to a traction surface or a lowered position with the free end thereof in substantial contact with the traction surface, a roller on the free end of the jack shaft and engageable with the traction surface when the free end of the jack shaft is lowered, a gear secured on the jack shaft adjacent the pivotal end thereof, a gear on the transmission shaft, said jack shaft gear adapted to be moved into and out of mesh with the transmission shaft gear during pivotal movement of the jack shaft and a resilient connection formed between one end of the cross shaft and the main frame permitting yielding movement of the cross shaft, the jack shaft and the jack shaft gear if the jack shaft gear and the transmission shaft gear do not mesh during engagement.

2. The combination with a transmission shaft on a motor driven vehicle of a jack shaft, a pivotal support for the shaft adjacent one end thereof, said pivotal connection permitting the opposite free end of the jack shaft to occupy a raised position parallel to a traction surface or a lowered position with the free end thereof in substantial contact with the traction surface, a roller secured on the free end of the jack shaft and engageable with the traction surface with the jack shaft is lowered, power actuated means connected with the free end of the jack shaft whereby the jack shaft is swung about its pivotal support from a raised to a lowered position or vice versa, means whereby a driving connection between the transmission shaft and the jack shaft is automatically connected or disconnected during pivotal movement of the jack shaft, a latch engageable with the jack shaft to support it in its raised position, manually controlled means for actuating the power actuated means and means connecting with said manual means for automatically swinging the latch out of engagement with the jack shaft when it is to be lowered.

3. In a vehicle lifting and propelling mechanism, a power shaft and a driven shaft whereby the propelling mechanism is driven, a gear on the power shaft, a gear on the driven shaft, means for meshing the gears and a resilient support for the driven shaft permitting yielding of the gears when they are moved into mesh.

4. In a vehicle lifting and propelling mechanism a power shaft and a driven shaft whereby the propelling mechanism is driven, a gear on the power shaft, a gear on the driven shaft, means for meshing the gears, and resilient means cooperating with the driven gear, said means yielding during the meshing operation to prevent breaking of the gear teeth in case of non-meshing of the teeth.

5. In a vehicle lifting and propelling mechanism a power shaft and a driven shaft whereby the propelling mechanism is driven, a pair of driving members one on each shaft, means for engaging said driving members, and resilient means insuring yielding engagement of the driving members.

6. In a vehicle lifting and propelling mechanism, a power shaft and a driven shaft whereby the propelling mechanism is driven, a pair of driving members one on each shaft, means for engaging said driving members, and resilient means cooperating with the driven member and insuring yielding engagement of the members.

7. In a motor vehicle an engine, a selective gear transmission, a single lever whereby said gear transmission is actuated, an auxiliary lifting and propelling device for the vehicle, means for transmitting power from the engine to actuate the lifting and propelling mechanism, and means actuated by the gear shift lever for controlling the transmission of power to the lifting and propelling mechanism.

8. In a motor vehicle a transmission through which the vehicle is driven, means controlling the transmission, an auxiliary lifting and propelling mechanism on the vehicle, means for transmitting power to actuate the lifting and propelling mechanism, and means actuated by the transmission controlling means for controlling the application of power.

9. The combination with the main frame of a motor vehicle of a vehicle lifting mechanism, a cushioning member secured to the main frame, a lifting device secured to the cushioning member, and means on the opposite end of the lifting member for engaging the ground surface and for supporting the frame in its lifted position.

10. The combination with the main frame of a motor vehicle of a vehicle lifting mechanism supported by the frame in its inoperative position and a resilient member forming a connection between said lifting device and the vehicle frame during the lifting operation.

11. The combination with the main frame of a motor vehicle of a vehicle lifting mechanism resiliently mounted on said frame.

12. The combination with the main frame of a motor vehicle of a vehicle lifting mechanism resiliently mounted on said frame, and means for preventing the extension of the main supporting springs during the lifting operation.

13. The combination with the main frame of a motor vehicle of a vehicle lifting mechanism, secured at one end to the frame, means at the opposite end of the mechanism for engaging the ground surface and for supporting the main frame in a lifted position, supporting means for engaging and securing the axle assembly and for preventing extension of the springs interposed between the axle assembly and the frame during lifting of the frame, said engaging means being automatically actuated by movement of the lifting member to move it into and out of engagement with the axle assembly and said means including a lost motion device.

14. The combination with the main frame of a motor vehicle of a vehicle lifting mechanism, secured at one end to the frame, means at the opposite end of the mechanism for engaging the ground surface and for supporting the main frame in lifted position, supporting means for engaging and securing the axle assembly and for preventing extension of the springs interposed between the axle assembly and the frame during lifting of the frame, and a lost motion connection between the lifting device and the axle assembly supporting member, said lost motion connection causing engagement of the supporting member before the lifting member engages the ground surface and maintaining the supporting member in engagement until the axle assembly is returned to normal position.

15. In a vehicle lifting and propelling mechanism of the character described, a lifting member having a pair of interspaced supporting wheels, one of said wheels being power propelled and means for positioning said wheels so that the power propelled wheel will support a larger proportion of the vehicle weight than the other wheel.

16. In a vehicle lifting and propelling mechanism of the character described, a lifting member having a pair of interspaced supporting wheels, said wheels being disposed one on each side of a central longitudinal axis drawn through the vehicle and said propelling wheel being closer to said central longitudinal axis than the other.

17. The combination with the main frame and the resiliently supported axle assembly of a motor vehicle of a lifting device, means for locking the axle assemble to the main frame to prevent extension of the resiliently supported axle assembly during lifting of the vehicle, and a lost motion link mechanism forming a connection between the lifting device and the locking means so as to automatically lock or release the locking means.

18. The combination with a motor vehicle of a lifting device therefor, comprising a pair of toggles, each toggle comprising upper and lower pivotally connected links, and means rigidly connecting the upper ends of the upper links.

19. The combination with a motor vehicle of a lifting device therefor comprising a pair of toggles, each toggle comprising upper and lower pivotally connected links, means rigidly connecting the upper ends of the upper links, and means for applying power to the pivotal connection between the links forming one of the toggles so as to extend or fold the toggles.

BROOKS WALKER.

Patent No. 1,742,566                  Granted January 7, 1930

BROOKS WALKER

The above entitled patent was extended July 24, 1951, under the provisions of the act of June 30, 1950, for 6 years and 214 days from the expiration of the original term thereof.

*Commissioner of Patents.*